(12) United States Patent
Kondo et al.

(10) Patent No.: US 9,631,061 B2
(45) Date of Patent: Apr. 25, 2017

(54) FIBER-REINFORCED COMPOSITE MATERIAL AND METHOD FOR PRODUCING THE SAME

(71) Applicant: Teijin Limited, Osaka-shi, Osaka (JP)

(72) Inventors: Yasuyuki Kondo, Matsuyama (JP); Takuro Kitamura, Tokyo (JP); Kazunari Kosaka, Tokyo (JP); Daisuke Kobayashi, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days.

(21) Appl. No.: 14/899,998

(22) PCT Filed: Jul. 30, 2014

(86) PCT No.: PCT/JP2014/070037
§ 371 (c)(1),
(2) Date: Dec. 18, 2015

(87) PCT Pub. No.: WO2015/016252
PCT Pub. Date: Feb. 5, 2015

(65) Prior Publication Data
US 2016/0145410 A1    May 26, 2016

(30) Foreign Application Priority Data

Aug. 1, 2013 (JP) ................. 2013-160507

(51) Int. Cl.
C08K 7/06 (2006.01)
C08K 3/04 (2006.01)
C08J 5/04 (2006.01)
C08J 5/10 (2006.01)

(52) U.S. Cl.
CPC ............... *C08K 3/04* (2013.01); *C08J 5/042* (2013.01); *C08J 5/047* (2013.01); *C08J 5/10* (2013.01); *C08K 7/06* (2013.01); *C08J 2377/00* (2013.01)

(58) Field of Classification Search
CPC ............ C08J 5/042; C08K 7/06; C08K 3/04
USPC .......................................... 428/338; 524/420
See application file for complete search history.

(56) References Cited

U.S. PATENT DOCUMENTS

| | | | | |
|---|---|---|---|---|
| 5,750,616 A | * | 5/1998 | Shimpuku | C08K 7/02 524/420 |
| 6,384,128 B1 | | 5/2002 | Wadahara et al. | |
| 2004/0102559 A1 | | 5/2004 | Oyamada et al. | |
| 2008/0295955 A1 | * | 12/2008 | Cawse | B32B 5/22 156/276 |
| 2010/0291821 A1 | * | 11/2010 | Kirchner | B29C 70/00 442/152 |
| 2013/0317161 A1 | * | 11/2013 | Konagai | B29C 70/12 524/495 |
| 2014/0004308 A1 | | 1/2014 | Taniguchi et al. | |
| 2015/0031257 A1 | | 1/2015 | Ootsubo et al. | |

FOREIGN PATENT DOCUMENTS

| | | |
|---|---|---|
| JP | S62-132960 A | 6/1987 |
| JP | 2004-306531 A | 11/2004 |
| JP | 2011-178890 A | 9/2011 |
| WO | WO2012/105080 * | 8/2012 |
| WO | WO 2012/133096 * | 10/2012 |
| WO | WO 2013/115337 * | 8/2013 |

OTHER PUBLICATIONS

Oct. 14, 2014—International Search Report—Intl App PCT/JP2014/070037.
Oct. 14, 2014—(WO) Written Opinion of ISA—Intl App PCT/JP2014/070037.
Jul. 16, 2016—(EP) Communication SESR—App 14831839.

* cited by examiner

*Primary Examiner* — Jim J Seidleck
*Assistant Examiner* — Deve E Valdez
(74) *Attorney, Agent, or Firm* — Banner & Witcoff, Ltd.

(57) ABSTRACT

A fiber-reinforced composite material obtained by reinforcing a matrix resin with fibers, wherein the matrix resin contains a thermoplastic resin and a carbon black, the fibers are discontinuous carbon fibers, a part of the discontinuous carbon fibers forms fiber bundles, and the thickness of a thinnest part of the matrix resin which is located between an outermost surface of the composite material and the fibers existing in an inside of the composite material is less than 100 μm. Further, it is preferred that the thermoplastic resin is a polyamide-based resin, that the discontinuous carbon fibers have a length of from 3 to 100 mm, and that the orientation of the discontinuous carbon fibers is random. Furthermore, it is preferred that the size of the primary particle diameter of the carbon black is within a range of 7 to 75 nm.

5 Claims, No Drawings

FIBER-REINFORCED COMPOSITE MATERIAL AND METHOD FOR PRODUCING THE SAME

CROSS REFERENCE TO RELATED APPLICATIONS

This is a U.S. National Phase Application under 35 U.S.C. §371 of International Application No. PCT/JP2014/070037, filed Jul. 30, 2014, which claims priority to Japanese Application No. 2013-160507, filed Aug. 1, 2013, the entire disclosures of which are incorporated herein by reference.

TECHNICAL FIELD

The present invention relates to a fiber-reinforced composite material, and more particularly to a fiber-reinforced composite material having high physical properties, which is composed of discontinuous fibers and a thermoplastic resin.

BACKGROUND ART

Fiber-reinforced composite materials have been widely employed as excellent lightweight materials having high physical properties, because mechanical strength of matrix resins can be reinforced by fibers having high strength. In particular, a fiber-reinforced composite material including short fibers (discontinuous fibers) as the reinforcing fibers and a thermoplastic resin as the matrix resin has high physical properties and easy processability, so that in recent years its application fields have been widened, and its large developments have been expected.

However, when the reinforcing fibers in the matrix resin are discontinuous short fibers, there has been a problem that ends of the fibers are easily projected from a surface resin layer, compared to the case where long fibers are used as continuous fibers. Further, when the modulus of the fibers is high, or when the matrix resin used is soft, this phenomenon has been remarkable. For example, when the thermoplastic resin is used as the matrix resin, the phenomenon of the reinforcing fibers in an inside of the composite material, breaking through the resin layer existing on the surface more easily occurs, because it is soft, compared to a thermosetting resin.

In particular, this problem has been remarkable in the case where the surface resin layer is thin and further the reinforcing fibers are inorganic fibers such as rigid carbon fibers, or in the case of the composite material in which single fibers are kept in a fiber bundle form.

Furthermore, a press molding method is known as a method for efficiently producing the composite material. However, the surface resin layer becomes thin, compared to the other methods such as injection molding, so that this tends to be disadvantageous for the above-mentioned fiber projection. In addition, in the press molding, the reinforcing fibers used are included in the composite material in a strongly deformed state at the time of the press molding, thereby resulting in that relatively higher internal stress than in the other methods remains. For this reason, when the strength of the thin resin layer on the surface of the composite material decreases in this state for some reason, the remaining internal stress is released. There has been a problem that the above-mentioned phenomenon of the fibers breaking through the surface resin layer of the fiber-reinforced composite material more easily occurs.

Such a phenomenon caused by the internal stress of the material at the time of the press molding is generally called spring back. Then, in the fiber-reinforced composite material, a part of this spring back phenomenon has tended to come to the surface as the projection phenomenon of the reinforcing fibers to the composite body surface.

For example, as a specific composite material, a composite material obtained by press molding a fiber matrix structure containing discontinuous carbon fibers and a thermoplastic resin is disclosed in Patent Document 1. However, such a composite material has a problem that internal stress tends to remains in the reinforcing fibers although it is a composite material having high physical properties and excellent surface quality. For example, when the physical properties of the surface matrix resin deteriorate with the lapse of time or the like, the surface quality has tended to deteriorate.

[Patent Document 1] JP-A-2011-178890

SUMMARY OF THE INVENTION

Problems that the Invention is to Solve

The present invention is to provide a fiber-reinforced composite material with small changes in surface appearance due to deterioration in weather resistance, despite having high physical properties.

Means for Solving the Problems

A fiber-reinforced composite material of the present invention is characterized in that it is a composite material obtained by reinforcing a matrix resin with fibers, wherein the matrix resin comprises a thermoplastic resin and a carbon black, the fibers are discontinuous carbon fibers, a part of the discontinuous carbon fibers forms fiber bundles, and the thickness of a thinnest part of the matrix resin which is located between an outermost surface of the composite material and the fibers existing in an inside of the composite material is less than 100 µm.

Further, it is preferred that the thermoplastic resin is a polyamide-based resin, that the length of the discontinuous carbon fibers is within a range of 3 to 100 mm, and that the orientation of the discontinuous carbon fibers is random. Furthermore, it is preferred that the size of the primary particle diameter of the carbon black is within a range of 7 nm to 75 nm.

Then, a method for producing a fiber-reinforced composite material of the other present invention is characterized in that an unmolded material including a thermoplastic resin, discontinuous carbon fibers and a carbon black is press molded.

Advantageous Effects of the Invention

According to the present invention, there is provided a fiber-reinforced composite material with small changes in surface appearance due to deterioration in weather resistance, despite having high physical properties

Mode for Carrying Out the Invention

A fiber-reinforced composite material according to the present invention is a composite material obtained by reinforcing a matrix resin with fibers. In addition, the matrix resin includes a thermoplastic resin and a carbon black, the fibers are discontinuous carbon fibers, and a part of the discontinuous carbon fibers forms fiber bundles.

Such a fiber-reinforced composite material of the present invention is a composite material in which the matrix resin is reinforced with the discontinuous carbon fibers, and the matrix resin is necessary to contain the thermoplastic resin. Further, this thermoplastic resin is preferably a main component of the matrix resin. As the thermoplastic resin used herein in the present invention, it is possible to use either a crystalline resin or a non-crystalline resin. In addition, it is preferred that the temperature corresponding to the melting point in the crystalline resin or the softening point in the non-crystalline resin is within a range of 180° C. to 350° C. When such a thermoplastic resin is used, a material particularly excellent in press moldability is obtained.

More specifically, the thermoplastic resins include, for example, polyolefine-based resins, polystyrene resins, styrene-based resins, polyamide-based resins, polyester-based resins, (meth)acrylic resins, polyarylate resins, polyphenylene ether resins, modified polyphenylene ether resins, thermoplastic polyimide resins, polyamide imide resins, polyether imide resins, polyether nitrile resins, phenoxy resins, polyphenylene sulfide resins, polysulfone resins, modified polysulfone resins, polyether sulfone resins, polyketone resins, polyether ketone resins, polyether ether ketone resins, polyether ketone resins, urethane resins, fluororesins, polybenzimidazole resins and the like.

In particular, the polyamide-based resins or polyester-based resins having good moldability are preferred. Specifically, as the polyamide-based resins, preferred are polyamide 6 resins (nylon 6), polyamide 11 resins (nylon 11), polyamide 12 resins (nylon 12), polyamide 46 resins (nylon 46), polyamide 66 resins (nylon 66), polyamide 610 resins (nylon 610) and the like. As the polyester-based resins, preferred are polyethylene terephthalate resins, polyethylene naphthalate resins, polybutylene terephthalate resins, polytrimethylene terephthalate resins, liquid crystal polyesters and the like.

Meanwhile, the thermoplastic resin used herein in the present invention should not be construed as being limited to one kind, and two or more kinds may be used. Embodiments of using two or more kinds of the thermoplastic resins include, for example, an embodiment of using the thermoplastic resins together which have softening points or melting points different from each other, an embodiment of using the thermoplastic resins together which have average molecular weights different from each other, and the like. Further, a thermosetting resin shall not be precluded from being contained as a part thereof.

Furthermore, in the fiber-reinforced composite material of the present invention, the discontinuous fibers having a short fiber form are used as the reinforcing fibers. In addition, as the discontinuous fibers used in the present invention, it is necessary to use the discontinuous carbon fibers composed of carbon fibers.

The carbon fibers used in the present invention include polyacrylonitrile (PAN)-based carbon fibers, petroleum-coal pitch-based carbon fibers, rayon-based carbon fibers, cellulose-based carbon fibers, lignin-based carbon fibers, phenol-based carbon fibers, vapor-grown carbon fibers and the like. Above all, the polyacrylonitrile (PAN)-based carbon fibers are preferably used in the present invention in terms of excellent tensile strength, and thereby being able to obtain the composite material having excellent physical properties.

Further, with respect to physical properties of the carbon fibers used for reinforcement, the tensile modulus thereof is preferably within a range of 100 GPa to 900 GPa, more preferably within a range of 220 GPa to 700 GPa, and still more preferably within a range of 230 GPa to 450 GPa. In uses for thermoplastic resin reinforcement, it is preferred that the tensile modulus is high. However, when it is too high, internal stress easily remains at the time of processing to cause a tendency to enlarge defects such as spring back. For example, when the modulus is too high, it is difficult to completely suppress the spring back, even when the other requirements of this application are fulfilled.

Furthermore, the tensile strength is preferably within a range of 2000 MPa to 10000 MPa, and more preferably within a range of 3500 MPa to 7000 MPa. The specific gravity of the fibers is preferably within a range of 1.4 to 2.4 g/cm$^3$. It is more preferably within a range of 1.5 to 2.0 g/cm$^3$.

Further, in the fiber-reinforced composite material of the present invention, the discontinuous fibers are used as a form of the reinforcing fibers. "Discontinuous" as used herein means discontinuous fibers cut to a certain length, not a single long fiber (filament) state. By using such discontinuous fibers, the highly isotropic fiber-reinforced composite material can be obtained in the present invention. In the case of reinforcement using the long fibers, anisotropy tends to be necessarily developed.

The fiber length of the discontinuous reinforcing fibers used in the present invention is preferably within a range of 3 mm to 100 mm, more preferably within a range of 10 mm to 80 mm, and particularly preferably within a range of 15 mm to 60 mm. By increasing the fiber length, the mechanical strength of the fiber-reinforced composite material can be increased, and in addition to that, the spring back tends to be less likely to occur on a surface of the fiber-reinforced composite material. From that viewpoint, it is further preferred to have a length of 20 mm or more. Conversely, by decreasing the fiber length, the anisotropy of the fiber-reinforced composite material is decreased, and in addition to that, the fluidity of the reinforcing fibers in the thermoplastic resin is improved, thereby tending to improve the moldability. In the present invention, an embodiment of using the discontinuous carbon fibers together which have fiber lengths different from each other is also preferred.

The fiber diameter of the carbon fibers used in the present invention is not particularly limited. However, the average fiber diameter thereof is preferably within a range of 3 μm to 50 μm, more preferably within a range of 4 μm to 12 μm, and still more preferably within a range of 5 μm to 10 μm. Within such a range of the fiber length or the fiber diameter, not only the physical properties of the reinforcing fibers are high, but also dispersibility thereof in the resin acting as the matrix is excellent. Further, for example, when a brittle material such as glass fiber is used, it is cut by press molding or the like. It is therefore difficult to secure such fiber length or fiber diameter.

Further, it is necessary that a part of the discontinuous carbon fibers used in the present invention forms fiber bundles. By using such fiber bundles, the composite material which is more excellent in terms of both productivity and reinforcing properties than a composite material comprising only single fibers completely separated has been obtained. For example, by containing the fiber bundles, the fluidity of a mixture of the resin and the fibers is significantly improved to obtain uniform physical properties. Further, in a fiber-reinforced resin composite body, the more the fiber content in an inside thereof is, the more the physical properties are generally improved. When the fibers are partly the fiber bundles, it becomes possible to easily increase the fiber content, and further, it becomes possible to improve also the production rate.

The fiber bundle is preferably a fiber bundle composed of several to 50000 single fibers, which is formed by partly bundling the discontinuous carbon fibers. Further, the number of the respective fibers (monofilaments) constituting the bundle is more preferably 10 or more, and particularly preferably 20 or more. Furthermore, it is preferred that 1000 to 50000 bundles and further 3000 to 40000 bundles are present, and particularly, it is preferred that 5000 to 30000 bundles are present.

The fiber bundle is preferably in a flat shape. For example, in the case of the reinforcing fibers of 24 K (24000 filaments), the width thereof is preferably within a range of 6 mm to 36 mm. In terms of the width per 1K (1000 filaments), it is preferably within a range of 0.25 mm/K to 1.5 mm/K. More preferably, it is within a range of 0.3 mm/K to 0.9 mm/K. Further, the thickness of the fiber bundle is preferably within a range of 0.05 mm/K to 0.5 mm. By forming such a flat fiber bundle, the fiber bundle is easily arranged in parallel to front and back plane surfaces of the composite body in the composite body, and therefore, the composite body in which the spring back is less likely to occur is obtained.

Usually, when the high-modulus reinforcing fibers such as the carbon fibers are present in the surface portion of the matrix resin in the form of the fiber bundle and as the discontinuous fibers, the so-called spring back that ends of the fibers break through the surface of the composite material tends to occur. However, in the fiber-reinforced composite material of the present invention, the matrix resin contains the carbon black described later together with the thermoplastic resin described above, so that it has become possible to significantly suppress deterioration of surface appearance of the composite material.

Further, a sizing agent may be adhered to surfaces of the discontinuous carbon fibers used in the present invention. As the sizing agent, an epoxy-based or polyester-based agent or the like may be used. As the adhesion amount thereof, the sizing agent is adhered preferably in an amount of 0 to 10 parts by dry weight based on 100 parts by weight of the fibers, and further, the adhesion amount is more preferably from 0.2 to 2 parts by weight.

Furthermore, together with application of the sizing agent or separately therefrom, it is also preferred that the surfaces of the reinforcing fibers are surface treated, and effects such as improvement in adhesiveness with the matrix resin and the like can be obtained. For example, the carbon fibers are preferably subjected to liquid-phase and gas-phase treatment, and particularly, in terms of productivity, stability, cost and the like, liquid-phase electrolytic surface treatment is preferably performed.

In particular, when the fibers are used as the fiber bundles (strands), by applying the sizing agent to the carbon fibers or performing the surface treatment, handling properties and bundling properties are improved, and adhesiveness and affinity of the reinforcing fibers with the matrix resin can be further improved.

Meanwhile, in the present invention, other reinforcing fibers may be used, in addition to the above-mentioned carbon fibers. In this case, all of inorganic fibers and organic fibers can be used together.

The form of these reinforcing fibers in the composite material is preferably a fiber assembly or nonwoven fabric in which the discontinuous carbon fibers are previously randomly oriented. More specifically, the form of a random mat in which the fibers are substantially two-dimensionally randomly oriented is preferred. By using such a random mat, isotropy of the fiber-reinforced composite material is more improved. Further, by taking such an arrangement, not only isotropy to the strength or size is improved but also the reinforcing effect due to the fibers is more efficiently exerted.

In the fiber-reinforced composite material of the present invention, it is essential that the matrix resin contains the carbon black together with the above-mentioned thermoplastic resin, in addition to the thermoplastic resin and discontinuous carbon fibers as described above. Here, more specifically, examples of the carbon blacks include channel blacks, furnace blacks, acetylene blacks, thermal blacks and the like. Moreover, furnace blacks which are suitable for mass production and whose particle diameter or structure is easily controllable, particularly furnace blacks obtained by an oil furnace method, are preferred. The furnace blacks are carbon blacks obtained by a production method of incompletely combusting oil or gas in a high-temperature gas to obtain the carbon blacks, and subdivided into oil furnace and gas furnace based on a material to be combusted. Further, it is preferred that the carbon black used in the present invention contains a sulfur component, and the content thereof in the carbon black is preferably within a range of 0.1% by weight to 2% by weight. Furthermore, it is more preferably within a range of 0.2% by weight to 0.75% by weight. By selecting such a carbon black, it becomes possible to more effectively decrease the spring back.

In addition, as the particle diameter of the carbon black, the size of the primary particle diameter is preferably within a range of 5 nm to 150 nm. Further, it is more preferably within a range of 7 nm to 75 nm, and particularly preferably within a range of 10 nm to 25 nm. When within this range, the effect of suppressing the spring back of the fiber-reinforced composite material can be balanced with the moldability thereof. When the size of the primary particle diameter is too small, deterioration of the moldability associated with a decrease in the fluidity of the matrix resin tends to be caused. Conversely, when it is too large, variation tends to occur in dispersion of the carbon black, and there is a possibility of decreasing the spring back suppressing effect.

Furthermore, the amount of the carbon black added in the composite material is preferably within a range of 0.1% by weight to 20% by weight, more preferably within a range of 0.2% by weight to 10% by weight, and particularly preferably within a range of 0.3% by weight to 2% by weight. When the amount of the carbon black added is too large, the fluidity of the matrix resin decreases, so that elongation of the fiber-reinforced composite material decreases at the time of processing such as press molding to deteriorate processability such as press moldability, thereby tending to narrow a design range. Conversely, when the amount of the carbon black added is too small, the spring back occurs, or the weather resistance decreases, thereby tending to fail to obtain the sufficient effect.

In the present invention, by containing such a carbon black, the fiber-reinforced composite material secures sufficient external appearance even after deterioration in weather resistance, and in addition, aesthetic properties have also been remarkably improved by a synergistic effect of the black carbon fibers and the black carbon black.

Further, in the composite material of the present invention, another inorganic filler may be blended in the matrix resin, in addition to the thermoplastic resin and the carbon black. The matrix resin of the present invention is a component mainly composed of a resin component constituting the matrix of the composite material and containing the carbon black in addition to the resin component. The other inorganic fillers used in addition to the carbon black include talc, calcium silicate, wallastonite, montmorillonite and various inorganic fillers. Further, another additive which has been conventionally blended in a matrix resin in a composite material, such as a heat-resistant stabilizer, an antistatic agent, a weather-resistant stabilizer, a light-resistant stabilizer, an anti-aging agent, an antioxidant, a softener, a dispersant, a filler, a colorant or a lubricant, can be blended in the resin to be the above-mentioned matrix, as needed.

The fiber-reinforced composite material of the present invention is characterized in that it is the composite material in which such a matrix resin is reinforced with the fibers, wherein the matrix resin contains the thermoplastic resin and the carbon black, the fibers are discontinuous carbon fibers, a part of the discontinuous carbon fibers forms fiber bundles, and the thickness of a thinnest part of the matrix resin which is located between the outermost surface of the composite material and the fibers existing in the inside of the composite material is less than 100 μm. The composite material has not only a usual sheet-like shape but also various shapes so as to be used as various parts. Further, the present invention is effective in a shape having a curved surface.

In the present invention, from the viewpoints of the aesthetic properties and physical properties, it is preferred that the thickness of the matrix resin containing the thermoplastic resin and the carbon black, which is located between the outermost surface of the composite material and the fibers of the discontinuous fibers existing in the inside of the composite material, is thin, and in the fiber-reinforced composite material of the invention, it is less than 100 μm. As the lower limit, the thickness of the matrix resin layer may be 0 μm in observation of a cross-sectional photograph, when the fibers do not exist in a fluff form on the surface of the composite material. However, in order to suppress the internal stress of the discontinuous carbon fiber bundles in the composite body to prevent the occurrence of the spring back, the resin layer is preferred to have a certain degree of thickness, and preferred to have a thickness of 0.01 μm or more even after a weather resistance test. When the matrix resin has such a degree of thickness, it becomes easy that the carbon black contained in the matrix resin sufficiently absorbs ultraviolet rays. The thickness of the matrix resin layer located between the fibers and the complex body surface as used herein means the distance between the fiber bundle or a fiber nearest to the surface of single fibers isolated from the bundle and the composite body surface.

Further, the thickness of the resin layer of the thinnest part of the matrix resin which is located between the outermost surface of the composite material and the discontinuous carbon fibers existing in the inside of the composite material is preferably within a range of 0.5 μm to less than 100 μm. When this resin layer is too thin, a portion containing no carbon black exists, which tends to cause the effect of suppressing the spring back to decrease. Conversely, when the thickness of the surface matrix resin layer is 100 μm or more, the surface is resin-rich, and a defect of projection of fiber ends such as the spring back does not occur. However, the difference in physical properties between the inside and the surface layer part of the composite body increases. Further, in particular, when a plurality of the composite materials are overlaid in a later step and remolded in a press step or the like, it is preferred that the thickness of the layer of only the matrix resin, in which the fibers on the composite material surface do not exist, is thin, in order to uniformly adjust the fiber content rate and the like. The thickness of the matrix resin layer is preferably from 0.5 μm to 50 μm, and more preferably from 1 μm to 20 μm.

Furthermore, from a different viewpoint, the thickness of the matrix resin layer (resin layer) on the surfaces of the discontinuous carbon fibers is preferably within a range of $\frac{1}{1000}$ times to 20 times the diameter of the carbon fibers. Moreover, it is more preferably within a range of $\frac{1}{10}$ times to 15 times, and particularly preferably within a range of 1 time to 3 times.

Meanwhile, here, the thickness of the resin layer of the thinnest part of the matrix resin which is located between the outermost surface of the composite material in the fiber-reinforced composite material and the fibers of the discontinuous carbon fibers existing in the inside of the composite material exerts a large influence on the degree of the spring back. Further, such a thickness of the matrix resin layer in which no fibers exist can be realized, because of the fibers having moderate modulus such as the carbon fibers. Furthermore, when the fiber-reinforced composite material of the present invention has the shape having the curved surface, the matrix resin in the curved surface portion is liable to become thin at the time of processing, and particularly, the composite material of the present invention is suitably used.

Although there is no particular limitation on a technique for thus controlling the resin layer on the surfaces of the carbon fibers, it can be easily obtained, for example, by a method of heating the composite material at high temperature so as to decrease the viscosity of the thermoplastic resin, and thereafter performing press molding. Basically, as conditions at the time of press molding, the thickness of the resin layer of the thinnest part of the thermoplastic resin which is located between the outermost surface of the composite material in the fiber-reinforced composite material and the fibers of the discontinuous carbon fibers existing in the inside of the composite material tends to become thin as the temperature of the composite material or a mold increases and as pressurizing force increases. Further, the fibers and the resin are preferred to be already mixed at the time of pressing. Conversely, when the fiber layer is previously formed, and the resin is overlaid on a surface thereof in another form such as a film shape, followed by pressing, the surface resin layer tends to become thin.

Above all, the carbon fibers used as the reinforcing fibers in the present invention keep rigid physical properties even at high temperature, so that the fibers are more arranged in the surface resin layer of the fiber-reinforced composite material, different from other common reinforcing fibers, and the spring back tends to easily occur. However, the present invention has succeeded in effectively decreasing such spring back by using the carbon black together with the thermoplastic resin in the matrix resin. Although the reason for this is not clear, it is considered that the carbon black has an excellent protective effect because the carbon black is the same as the carbon fibers used for reinforcement in chemical composition and is fine particles to have a much larger surface area than the carbon fibers. In particular, it is considered that the spring back is triggered by deterioration of an interface between the carbon fibers and the thermoplastic resin in contact with the carbon fibers, and it is considered that the area of the interface has been substantially increased by the presence of the carbon black, thereby dispersing and diffusing deterioration starting points.

Further, by adding the carbon black as fine particles into the matrix resin, an anchor effect or adhesion with the carbon fibers has been increased to obtain the composite material having excellent adhesive force. Furthermore, by addition of the carbon black, it has also become possible to effectively prevent cracks of the surface resin layer. Meanwhile, the carbon black also has an effect of absorbing ultraviolet rays, and there is a little concern of breading out, different from other ultraviolet absorbers. It is therefore possible to be more suitably used.

In the present invention, thus the carbon fibers also exist near the surface of the fiber-reinforced composite material, thereby enhancing the reinforcing effect to the composite material improved in the content rate of the carbon fibers, and suppressing small difference in physical properties in a thickness direction of the fiber-reinforced composite material to have obtained the fiber-reinforced composite material more excellent in material uniformity.

In the present invention, the carbon black is contained in the resin to be the matrix, and even when the resin layer existing on the surface is thin, improvement to the practically sufficient strength has become possible. Further, the carbon fibers are usually black in color, and therefore tend to easily absorb light energy. The carbon black is also black in color, so that it can effectively prevent deterioration of the carbon fibers and the resin constituting the matrix around them. Usually, in the case where the carbon fibers are discontinuous fibers as in the present invention, when the surface of the composite material is deteriorated, the spring back tends to easily occur at cut surfaces of the discontinuous fibers on the surface of the composite material or in a portion to which stress is concentrated by bending. However, in the present invention, such a defect has been solved by the appropriate combination of the carbon fibers and the carbon black.

The weather resistance of the fiber-reinforced composite material of the present invention can be confirmed, for example, by evaluating appearance, glossiness, changes in color difference and the degree of spring back after passing through an accelerated weathering test. When has passed through a molding step such as pressing, the fiber-reinforced composite material of the present invention essentially has high surface glossiness. Then, when the resin layer existing on the surface thereof is deteriorated with time, the carbon fibers come out to the surface of the composite material to decrease glossiness, and the weather resistance can be grasped by measuring the glossiness and the like. Meanwhile, even worse, cracking or peeling of the resin layer occurs by the accelerated weathering test, and the fibers are sometimes fluffed. The deterioration can also be judged by the appearance, in addition to the glossiness and changes in color difference. In the fiber-reinforced composite material of the present invention, such deterioration of the weather resistance is very effectively decreased. Further, the fiber-reinforced composite material of the present invention exerts the significant effect in the case of the shape having the curved surface. This is because in addition to a tendency of the surface matrix resin layer becoming thin at the time of surface processing, the high-modulus carbon fibers do not follow bending processing, and tend to be arranged on the surface of the composite material.

Such fiber-reinforced composite materials of various shapes are suitably used as surface members of various structures or products.

Such a fiber-reinforced composite material of the present invention can be obtained by a method for producing a fiber-reinforced composite material, which is the other present invention, that is, a production method of press molding an unmolded material containing a thermoplastic resin, discontinuous carbon fibers as reinforcing fibers and a carbon black.

As the thermoplastic resin, the reinforcing fibers and the carbon black which are used herein, ones described in the description of the above-mentioned fiber-reinforced composite material can be used. In particular, as the reinforcing fibers, it is preferred to use discontinuous carbon fiber bundles. Then, in the method for producing a fiber-reinforced composite material of the present invention, preferred is a production method of once obtaining the unmolded material comprising the thermoplastic resin, the discontinuous carbon fibers and the carbon black (a structure in which the discontinuous carbon fibers and the matrix resin are mixed) as described above, and subsequently performing press molding.

Here, in the reinforcing fiber matrix structure as the unmolded material, the matrix resin is preferred to exist in a structure composed of the reinforcing fibers in a granular, film or solution form before the initial press step. More specifically, the unmolded material is preferably formed by using a mixture containing the reinforcing fibers and the resin having a shape of a granular material or a film-like material, or having an indefinite shape of the solution form. Meanwhile, when the resin is the granular material herein, it may have various forms such as a fibrous form, a powdery form and a needle-like material. Further, the discontinuous carbon fibers (reinforcing short fibers) are preferred to have a fiber bundle shape, in terms of production efficiency and physical properties thereof.

Above all, in the production method of the present invention, it is preferred to already sufficiently mix the fibers and the resin before the press step. Deformation of the fibers in the press step is decreased, and the generation of stress can be suppressed, so that it is possible to more effectively decrease the spring back. Conversely, when the fiber layer is previously formed and the resin is overlaid thereon in another form such as a film shape, followed by pressing, deformation of the fibers tends to be increased. Then, the fibers are increased in density in the press step to decrease impregnation properties, and uniform impregnation tends to be difficult.

Preferred examples of such unmolded materials using the reinforcing fibers include, for example, a random mat as described below.

The average fiber length of the carbon fibers used in the random mat is preferably within a range of 3 mm to 100 mm, more preferably within a range of 10 mm to 80 mm, particularly preferably within a range of 15 mm to 60 mm and still more preferably within a range of 20 mm or more. The random mat may be formed with the carbon fiber having one of the fiber length, or two or more of the fiber lengths in combination.

In order to randomly arrange the reinforcing fibers, it is preferred that the fiber bundles are opened. The random mat is preferred which is composed of the fiber bundles converted to short fibers and the resin for forming the above-mentioned matrix and in which the fibers are substantially randomly in-plane oriented.

The existing amount of the fibers in the random mat is preferably a ratio of 10% by volume to 90% by volume, taking the whole composite material as 100. It is more preferably within a range of 15% by volume to 80% by volume, and particularly preferably within a range of 20% by volume to 60% by volume.

There is no particular limitation on the number of the single fibers of the reinforcing fibers constituting each fiber bundle obtained after opening. However, specifically, it is preferably from 3 to 5000. Above all, it is more preferably from 10 to 4000, and still more preferably from 10 to 2000.

It is possible to produce such a random mat using the reinforcing fibers, for example, through specific steps as described below.

1. A cutting step of cutting the reinforcing carbon fiber bundles to the discontinuous carbon fibers
2. An opening step of introducing the discontinuous carbon fibers cut into a tube and blowing air to the fibers, thereby opening the fiber bundles
3. An applying step of spreading the opened fibers and spraying the resin acting as the matrix
4. A fixing step of fixing the applied fibers and the resin acting as the matrix In these steps, in the applying step of 3, a step of spreading only the fibers and placing a resin film or a molten matrix resin thereon or a step of impregnating the fibers with a resin solution can also be employed, instead of the step of concurrently spraying the resin to be the matrix, as described above. However, when the fibers and the resin are once formed as separate sheets, mixing of both is difficult. It is therefore preferred to prepare the sheet mixed at once as the applying step of 3. Further, when the discontinuous carbon fibers are partly in a fiber bundle state, the other discontinuous carbon fibers may be in a single fiber state.

Here, the areal weight is preferably within a range of 200 $g/m^2$ to 10000 $g/m^2$, and the thickness is preferably within a range of 10 mm to 150 mm. When the density is high in this stage, the thickness is recovered in a step heated later, such as the press step, and the density is once extremely decreased. Accordingly, the composition ratios of the resin and the fibers in the surface and the inside of the composite body vary to cause a tendency to be unstable in physical properties. As a step for obtaining moderate density, a dry molding method is preferred, and a wet molding method such as papermaking tends to easily provide high density. Further, in a high-density article, the fibers are liable to be essentially oriented on a plane surface, and the peeling strength in a thickness direction of a final product tends to decrease. Furthermore, the fluidity of the fibers or the matrix resin decreases at the time of molding, and shaping properties to a mold also decrease.

In this production method of the present invention, it is preferred to obtain the random mat containing the fiber bundles and the other opened fibers by controlling the degree of opening of the reinforcing fibers in the resin. The random mats suitable for various uses and objects can be provided by suitably controlling the opening ratio.

For example, the fiber bundles are cut and introduced into a tapered tube, and compressed air is blown thereto by flowing it, thereby being able to obtain the random mat. By preparing the suitable random mat, it becomes possible to more densely adhere the fibers and the resin to achieve high physical properties.

The production method of the present invention is a method of press molding the unmolded material (fiber matrix structure) such as the mat as described above. Further, cold press is also preferred in which the mold temperature in this press molding is equal to or lower than the melting point of the resin. By performing pressing at such a mold temperature, it becomes possible to remove a product from the mold at the same time as the molding finishes, and it becomes possible to secure high productivity.

In the present invention, it becomes possible to decrease the thickness of the resin layer on the surfaces of the reinforcing discontinuous carbon fibers by passing through the press step. Further, it is preferred to use the thermoplastic resin having high fluidity. Thus, on the surface of the composite material, the thermoplastic resin layer is thin, and the black discontinuous carbon fibers and the black carbon black are aesthetically arranged. It has therefore become possible to obtain the composite material excellent in physical properties and surface appearance, despite having high efficiency.

Further, it is preferred to previously preheat the unmolded material at the time of press molding. The temperature of the unmolded material at the time of press molding is preferably equal to or higher than the melting point of the thermoplastic resin. The upper limit thereof is preferably a 150° C. temperature higher than the melting point. It is more preferably within a temperature range of 20° C. higher than the melting point to 100° C. higher than the melting point. The specific temperature is preferably within a range of 220° C. to 320° C., and particularly preferably within a range of 240° C. to 300° C. By thus preheating the unmolded material, it becomes possible to more effectively perform cold press or hot press just after that.

The shape of the unmolded material before pressing is preferably plate-like or sheet-like, because a uniform shape is easily obtained. In the production method of the present invention, the morphological degree of freedom at the time of press molding is high, in spite of the structure composed of the fibers and the resin, and it becomes possible to perform press molding to various shapes using such a sheet-like unmolded material. In particular, it is optimally used for a shape having a curved surface or a bent part. This is because the thickness of the matrix resin between the surface of the composite body obtained and the fibers tends to become thinner at the curved surface or the bent part. The method for producing a fiber-reinforced composite material of the present invention is also preferably a production method of performing press processing having a curved surface or bending processing.

Further, from the viewpoint of securing the degree of freedom of working steps, it is preferred that pre-press molding is previously performed at a temperature equal to or higher than the melting point of the matrix resin before pressing to perform preforming to a shape such as a plate form. After pre-press molding, the shape such as the plate form is kept even at the time of transfer, so that stable production becomes possible even when any process layout is employed. Such an unmolded material (intermediate base material) subjected to the pre-press molding is useful as a material form of the press molding. For example, by overlaying two or more thin intermediate base materials on each other, and pressing a plurality thereof at once, it becomes possible to produce composite materials having various shapes and various products.

However, in order to increase the production efficiency, the method for producing a composite material of the present invention is preferred to be performed in a continuous single step. In that case, it is preferred that the pre-press molding step is not performed However, in the production method of the present invention, the shape is once given in a high temperature state at the time of press molding, and thereafter the molding is completed by cooling solidification. Accordingly, deforming stress tends to easily remain as internal stress in the rigid discontinuous carbon fibers. This is because even the thermoplastic resin in the high temperature state has a certain degree of viscosity, and further, pressure is applied by a press mold, so that the discontinuous carbon fibers are exposed to the deforming stress such as bending. However, in the present invention, the carbon black is contained in the matrix resin, and the strength of the thinnest part of the thermoplastic resin which is located between the surface of the composite material after deterioration in weather resistance and the bundles of the discontinuous carbon fibers existing in the inside of the composite material is improved to the practically sufficient strength.

The carbon black efficiently absorbs UV-rays that cause deterioration in weather resistance and converts them to heat, so that deterioration of the thinnest part of the thermoplastic resin which is located between the outermost surface of the composite material and the bundles of the discontinuous carbon fibers existing in the inside of the composite material can be effectively prevented.

The fiber-reinforced composite material obtained by such a production method of the present invention is composed of the resin having excellent physical properties and the discontinuous carbon fibers, and integrated by press molding, so that the material satisfying extremely high surface appearance and high physical properties is obtained.

Then, such a fiber-reinforced composite material of the present invention has a smooth surface and is also excellent in design properties, so that it is suitably used for members of automotive interior materials which are directly touched by people. Further, it is not only excellent in design properties, but also excellent in weather resistance, and therefore can also be used for vehicle structures such as automotive exterior materials and structure members requiring high physical properties and weather resistance. In addition, it is also suitably used as composite materials used under severe conditions such as outdoor structures.

EXAMPLES

The present invention will be described below in more detail with reference to examples. However, the following examples should not be construed as limiting the present invention. Also, the examples of the present invention were evaluated by the methods shown below.

<Accelerated Weather Resistance>

An accelerated weathering deterioration test was performed to a surface of a random mat molded product after press molding for 1900 hours by using an accelerated weathering tester ("Super Xenon Weather Meter SX-1" manufactured by Suga Test Instruments Co., Ltd.). As a testing standard, conditions of "SAE J2527, Daylight Filter" were used.

<Spring Back Evaluation>

The number of spring back fibers was evaluated for the surface before and after the accelerated weathering test. That is, a cellophane tape ("Cellotape" manufactured by Nichiban Co., Ltd., tape width 15 mm×length 55 mm) was attached to the press-molded surface of the random mat molded product before and after the accelerated weathering test, and pressed with a finger. Thereafter, the cellophane tape was separated. An adhesive face of the cellophane tape after separation was observed by an optical microscope, and the number of fibers separated from the surface of the random mat molded product was measured.

Further, with respect to a state of spring back on the surface, the press-molded surface of the random mat molded product and the deteriorated surface after the accelerated weathering test were observed at 100- to 1000-fold magnification, using an optical microscope (manufactured by Keyence Corporation, Digital Microscope "VHX-1000").

<Bending Strength>

Method A (a three-point bending test) was performed with reference to JIS K7074 using a universal tester manufactured by Instron Corporation. Taking the average value obtained from five test pieces as the bending strength, and taking the value of Comparative Example 1 containing no carbon black as the standard (100), the bending strength of the other samples was evaluated.

<Thickness Measurement of Surface Resin Layer>

A random mat molded product after press molding was cut, and a section thereof was in turn polished with water-resistant files of No. 600 to No. 2000 and buffed to obtain a test piece for section observation. The section was observed in a range of a field of view of 750 µm square (300-fold) using an optical microscope (manufactured by Keyence Corporation, Digital Microscope "VHX-1000"), and the thickness of a resin layer between a surface of a fiber-reinforced composite material and fibers existing in the inside thereof was measured. This was taken as the thickness of a resin layer on surfaces of discontinuous carbon fibers.

Further, as another method for measuring the resin layer on the surfaces of the discontinuous carbon fibers, for the test piece in which the surface resin layer was separated after the weathering test, the thickness of the surface resin layer separated was measured by image processing using "depth synthesis" and "3D synthesis" functions of the above-mentioned optical microscope ("VHX-1000").

<Color Difference Measurement>

Using the above-mentioned intermediate base material test piece as a measurement sample, the color difference of the exposed surface was measured. For color difference measurement, a spectrophotometer CC-m (manufactured by Suga Test Instruments Co., Ltd.) was used, and the color difference ($\Delta E^*ab$) was measured. Also, test conditions were $\Phi 10$, de:$8°$ and D65/$10°$. The color difference before and after the deterioration was measured.

Example 1

As a matrix resin, a master batch was prepared which was obtained by mixing a carbon black (oil furnace carbon black, manufactured by Cabot Japan K.K., "BLACK PEARLS 800", average primary particle diameter: 17 nm, sulfur content: 0.5% by weight) with a nylon 6 resin ("A1030BRF-BA" manufactured by Unitika Ltd.) for a matrix resin. This master batch and resin pellets were compounded, and the carbon black was mixed therewith so as to give a content of 1.8% by weight, followed by pulverization to a powdery form. This was used as the matrix resin.

On the other hand, carbon fibers were prepared as reinforcing fibers. First, a carbon fiber strand (manufactured by Toho Tenax Co., Ltd., "Tenax STS-24K N00", diameter 7 µm×24000 filaments, fineness: 1.6 g/m, tensile strength: 4000 MPa (408 kgf/mm$^2$, tensile modulus: 238 GPa (24.3 ton/mm$^2$) was continuously immersed in an epoxy-based sizing agent, and allowed to pass through a drying furnace of 130° C. for about 120 seconds, thereby performing drying-heat treatment to obtain a carbon fiber bundle having a thickness of 0.1 mm and a width of about 12 mm. The adhesion amount of the sizing agent was 1% by weight. This fiber bundle was cut to a length of 20 mm to obtain reinforcing fibers.

Subsequently, using the above-mentioned powdery matrix resin and discontinuous carbon fibers, a random mat composed of the matrix resin and the discontinuous carbon fibers was prepared. First, the fibers and the powdery matrix resin were introduced into a tapered tube, and the discontinuous carbon fibers were sprayed together with the resin on a table provided at a lower portion of an outlet of the tapered tube, while blowing air to the discontinuous carbon fibers to partly open the fiber bundles. The state of the discontinuous carbon fibers at this time was a state including the carbon fibers in a single fiber state and the discontinuous carbon fibers in a fiber bundle state.

The fibers and resin sprayed on the table were suctioned by a blower from a lower portion of the table, and fixed. Eight sheets each having a thickness of 5 mm were overlaid on one another to obtain an unmolded material having an areal weight of 2800 g/m² in an unmolded stage.

The unmolded material obtained was hot pressed by a hot press apparatus at 260° C. to obtain a fiber-reinforced composite material having a thickness of 2 mm and a fiber volume content (Vf) of 35% by volume.

The bending strength, surface glossiness and accelerated weather resistance of this carbon fiber random mat molded product were evaluated. The spring back of the fibers was evaluated for the random mat molded product after the accelerated weathering test for 1900 hours. As a result, it was 0. The physical properties are shown in Table 1.

Also, the thickness of the thinnest part of the thermoplastic resin located between a surface and the fiber bundles of the discontinuous carbon fibers existing in the inside of the composite material, which was measured by the optical microscope in the section of the random mat before the accelerated weather resistance evaluation, was 1.3 μm. The resin layer was not separated from the deteriorated test piece, and spring back of the fibers on the measured surface was not observed.

Examples 2 and 3

Pressed carbon fiber random mat molded products (composite materials) having a fiber volume content (Vf) of 35% by volume were obtained in the same manner as in Example 1 with the exception that the amount of the carbon black added into the resin constituting the matrix was changed from 1.8% by weight in Example 1 to 1.2% by weight (Example 2) and 0.6% by weight (Example 3).

The bending strength, surface glossiness and accelerated weather resistance of these carbon fiber random mat molded products were evaluated, and the physical properties are shown together in Table 1 (meanwhile, Example 3 is also shown together in Tables 2 and 3 for comparison).

Also, according to the measurement of the thickness of the surface resin layer by the optical microscope in the section of the random mat molded product before the accelerated weather resistance evaluation, the thinnest part showed a value of 1.3 μm in Example 2, and a value of 1.0 μm in Example 3. Further, in both Example 2 and Example 3, the surface layer was not separated from the deteriorated test piece, and in respective Examples, the spring back of the fibers on the measured surface was not observed.

Example 4

A pressed carbon fiber random mat molded product (composite material) having a fiber volume content (Vf) of 35% by volume was obtained in the same manner as in Example 1 with the exception that the amount of the carbon black added into the resin constituting the matrix was changed from 1.8% by weight in Example 1 to 0.1% by weight (Example 4).

The bending strength, surface glossiness and accelerated weather resistance of this carbon fiber random mat molded product were evaluated, and the physical properties are shown together in Table 1.

Also, according to the measurement of the thickness of the surface resin layer by the optical microscope in the section of the random mat molded product before the accelerated weather resistance evaluation, the thinnest part showed a value of 1.0 μm in Example 4. Further, the surface layer was not separated from the deteriorated test piece, but cracks occurred in the surface resin layer. In this Example, the spring back of the fibers on the measured surface was observed in 8 fibers.

Comparative Example 1

A pressed carbon fiber random mat molded product (composite material) having a fiber volume content (Vf) of 35% by volume was obtained in the same manner as in Example 1 with the exception that the amount of the carbon black added was changed to 0% by weight without adding the carbon black.

The bending strength, surface glossiness and accelerated weather resistance of this carbon fiber random mat molded product were evaluated, and the physical properties are shown together in Table 1. The spring back state of the fibers was evaluated for the random mat molded product after the accelerated weathering test for 1900 hours. As a result, the surface quality was decreased as 108 spring back fibers.

Also, according to the measurement of the thickness of the surface resin layer by the optical microscope in the section of the random mat molded product before the accelerated weather resistance evaluation, the thinnest part showed 1.3 μm as was the case in Example 1. Then, the thickness of the matrix resin layer at a part where the surface resin layer after the accelerated weathering test was separated was measured by the image processing. As a result, one having a maximum thickness of 15 μm was also observed.

TABLE 1

|  |  | Example 1 | Example 2 | Example 3 | Example 4 | Comparative Example 1 |
|---|---|---|---|---|---|---|
| Surface Resin Layer Thickness (Initial) | μm | 1.3 | 1.3 | 1.0 | 1.0 | 1.3 |
| Amount of Carbon Black Added | wt % | 1.8 | 1.2 | 0.6 | 0.1 | 0 |
| Bending Strength (Based on Comparative Example 1) | % | 104 | 115 | 112 | 110 | 100 |
| After Accelerated Weathering Test |  |  |  |  |  |  |
| Number of Spring Back Fibers |  | 0 | 0 | 0 | 8 | 108 |
| Color Difference |  | 1.1 | 5.1 | 2.8 | 7.5 | 18.6 |

Example 5

A pressed carbon fiber random mat molded product (composite material) having a fiber volume content (Vf) of 35% by volume was obtained in the same manner as in Example 3 with the exception that the mold temperature at the time of press molding was changed from 260° C. to 280° C.

The bending strength, surface glossiness and accelerated weather resistance of this carbon fiber random mat molded product were evaluated, and the physical properties are shown together in Table 2.

Also, according to the measurement of the thickness of the surface resin layer by the optical microscope in the section of the random mat molded product before the accelerated weather resistance evaluation, the thinnest part showed a value of 0.3 μm.

Further, the surface layer was not separated from the deteriorated test piece, but cracks occurred in the surface resin layer. In this Example, the spring back of the fibers on the measured surface was observed in 7 fibers.

Examples 6 and 7

Pressed carbon fiber random mat molded products (composite materials) having a fiber volume content (Vf) of 35% by volume were obtained in the same manner as in Example 3 with the exception that the primary particle diameter of the carbon black was changed from 17 nm in Example 3 to 7 nm in Example 6 and to 50 nm in Example 7.

The bending strength, surface glossiness and accelerated weather resistance of these carbon fiber random mat molded products were evaluated, and the physical properties are shown together in Table 2.

Also, according to the measurement of the thickness of the surface resin layer by the optical microscope in the section of the random mat molded product before the accelerated weather resistance evaluation, the thinnest part showed a value of 1.3 μm in both Examples 6 and 7. Further, in both Examples 6 and 7, the surface layer was not separated from the deteriorated test piece, and in respective Examples, the spring back of the fibers on the measured surface was not observed.

Example 8

A pressed carbon fiber random mat molded product (composite material) having a fiber volume content (Vf) of 35% by volume was obtained in the same manner as in Example 3 with the exception that the primary particle diameter of the carbon black was changed from 17 nm in Example 3 to 100 nm in Example 8.

The bending strength, surface glossiness and accelerated weather resistance of this carbon fiber random mat molded product were evaluated, and the physical properties are shown together in Table 2.

Also, according to the measurement of the thickness of the surface resin layer by the optical microscope in the section of the random mat molded product before the accelerated weather resistance evaluation, the thinnest part showed a value of 1.3 μm.

Further, the surface layer was not separated from the deteriorated test piece, but cracks occurred in the surface resin layer. In this Example, the spring back of the fibers on the measured surface was observed in 4 fibers.

TABLE 2

|  |  | Example 3 | Example 5 | Example 6 | Example 7 | Example 8 |
|---|---|---|---|---|---|---|
| Surface Resin Layer Thickness (Initial) | μm | 1.0 | 0.3 | 1.3 | 1.3 | 1.3 |
| Press Temperature | °C. | 260 | 280 | 260 | 260 | 260 |
| Amount of Carbon Black Added | wt % | 0.6 | 0.6 | 0.6 | 0.6 | 0.6 |
| Particle Diameter | nm | 17 | 17 | 7 | 50 | 100 |
| Bending Strength (Based on Comparative Example 1) After Accelerated Weathering Test | % | 112 | 107 | 109 | 111 | 102 |
| Number of Spring Back Fibers |  | 0 | 7 | 0 | 0 | 4 |
| Color Difference |  | 2.8 | 6.8 | 4.5 | 4.4 | 5.7 |

Examples 9 and 10

Pressed carbon fiber random mat molded products (composite materials) having a fiber volume content (Vf) of 35% by volume were obtained in the same manner as in Example 3 with the exception that the carbon fiber length was changed from 20 mm in Example 3 to 5 mm in Example 9 and to 50 mm in Example 10.

The bending strength, surface glossiness and accelerated weather resistance of these carbon fiber random mat molded products were evaluated, and the physical properties are shown together in Table 3.

Also, according to the measurement of the thickness of the surface resin layer by the optical microscope in the section of the random mat molded product before the accelerated weather resistance evaluation, the thinnest part showed a value of 1.3 μm in both Examples 9 and 10.

Further, in both Examples 9 and 10, the surface layer was not separated from the deteriorated test piece, and in respective Examples, the spring back of the fibers on the measured surface was not observed.

Comparative Example 2

A pressed carbon fiber random mat molded product (composite material) having a fiber volume content (Vf) of 35% by volume was obtained in the same manner as in Example 9 with the exception that the amount of the carbon black added was changed to 0% by weight without adding the carbon black.

The bending strength, surface glossiness and accelerated weather resistance of this carbon fiber random mat molded product were evaluated, and the physical properties are shown together in Table 3. The spring back state of the fibers was evaluated for the random mat molded product after the accelerated weathering test for 1900 hours. As a result, the surface quality was decreased as 55 spring back fibers. By the way, in Comparative Example 1 (fiber length: 20 mm) in which the fiber length is longer than in Comparative Example 2, the number of spring back fibers was 108.

Also, according to the measurement of the thickness of the surface resin layer by the optical microscope in the section of the random mat molded product before the accelerated weather resistance evaluation, the thinnest part showed 1.3 μm as was the case in Example 1. Then, the thickness of the matrix resin layer at a part where the surface resin layer after the accelerated weathering test was separated was measured by the image processing. As a result, one having a maximum thickness of 15 μm was also observed.

Comparative Example 3

A pressed carbon fiber random mat molded product (composite material) having a fiber volume content (Vf) of 35% by volume was obtained in the same manner as in Example 1 or 3 with the exceptions that the carbon black in the resin constituting the matrix was changed to a hindered amine-based polymeric photostabilizer (manufactured by Adeka Corporation, "LA-63P") and that the amount thereof added was changed to 0.2% by weight (Comparative Example 3).

The bending strength, surface glossiness and accelerated weather resistance of the carbon fiber random mat molded product obtained were evaluated, and the physical properties are shown together in Table 3. On the surface of the random mat molded product after the accelerated weathering test for 1900 hours, the spring back of the fibers occurred, and it was significantly inferior in surface appearance.

TABLE 3

|  |  | Example 3 | Example 9 | Example 10 | Comparative Example 2 | Comparative Example 3 |
|---|---|---|---|---|---|---|
| Surface Resin Layer Thickness (Initial) | μm | 1.0 | 1.3 | 1.3 | 1.3 | 1.3 |
| Amount of Carbon Black Added | wt % | 0.6 | 0.6 | 0.6 | 0 | HB-based |
| Carbon Fiber Length | mm | 20 | 5 | 50 | 5 | 20 |
| Bending Strength (Based on Comparative Example 1) After Accelerated Weathering Test | % | 112 | 107 | 105 | 106 | 109 |
| Number of Spring Back Fibers |  | 0 | 0 | 0 | 55 | 10 |
| Color Difference |  | 2.8 | 4.2 | 3.8 | 17.6 | 8.3 |

HB-based: A hindered amine-based polymeric photostabilizer

The invention claimed is:

1. A surface member of a structure or a product, wherein the surface member is a fiber-reinforced composite material in which a matrix resin is reinforced with fibers, the matrix resin comprises a thermoplastic resin and a carbon black, the fibers are discontinuous carbon fibers, and a part of the discontinuous carbon fibers forms fiber bundles, and a thickness of a thinnest part of the matrix resin, which is located between an outermost surface of the composite material and the fibers existing in an inside of the composite material, is within a range of 0.5 μm to less than 100 μm.

2. The surface member of a structure or product according to claim 1, wherein the thermoplastic resin is a polyamide-based resin.

3. The surface member of a structure or product according to claim 1, wherein a length of the discontinuous carbon fibers is within a range of 3 mm to 100 mm.

4. The surface member of a structure or product according to claim 1, wherein an orientation of the discontinuous carbon fibers is random.

5. The surface member of a structure or product according to claim 1, wherein a size of a primary particle diameter of the carbon black is within a range of 7 nm to 75 nm.

* * * * *